United States Patent [19]

Tanigawa

[11] Patent Number: 4,484,560
[45] Date of Patent: Nov. 27, 1984

[54] DIAMOND SEGMENTED SAW BLADE

[75] Inventor: Takesaburo Tanigawa, Ueno, Japan

[73] Assignee: Asahi Diamond Industrial Co., Ltd., Tokyo, Japan

[21] Appl. No.: 507,347

[22] Filed: Jun. 24, 1983

[30] Foreign Application Priority Data

Jul. 13, 1982 [JP] Japan .................. 57-105948[U]

[51] Int. Cl.³ .............................................. B28D 1/04
[52] U.S. Cl. ..................................... 125/15; 51/206.4; 51/206.5; 407/41; 407/49; 407/50
[58] Field of Search ............ 125/15; 51/206 R, 206.4, 51/206.5; 407/41, 49, 50

[56] References Cited

U.S. PATENT DOCUMENTS 3,221,728 12/1965 Lindblad .............................. 125/15

FOREIGN PATENT DOCUMENTS 2314977 10/1974 Fed. Rep. of Germany ........ 125/15

Primary Examiner—Harold D. Whitehead
Attorney, Agent, or Firm—McAuley, Fields, Fisher, Goldstein & Nissen

[57] ABSTRACT

A diamond segmented saw blade having a steel center is provided with a plurality of sockets about the rim and a plurality of cutting tip supports having diamond impregnated tips. Each socket is provided with an upper surface inclined upwardly and inwardly and a tapered or wedge-shaped dovetail groove. Each support is provided with a depending tenon. The surfaces adjacent the tenon are inclined upwardly and inwardly complementary to the surfaces adjacent the socket. The tenon is similarly wedge-shaped to fit in the dovetail groove so that the support and socket are firmly interlocked to insure easy and free exchange of diamond impregnated tips.

6 Claims, 6 Drawing Figures

U.S. Patent  Nov. 27, 1984  Sheet 1 of 2  4,484,560
(PRIOR ART)
Fig-1.
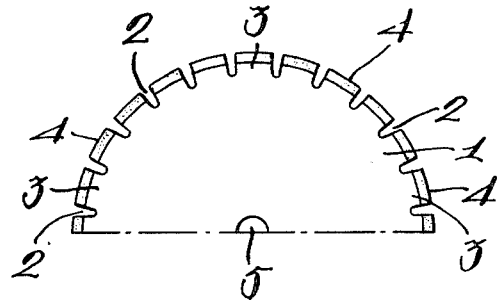
(PRIOR ART)
Fig-2.
(PRIOR ART)
Fig-3.
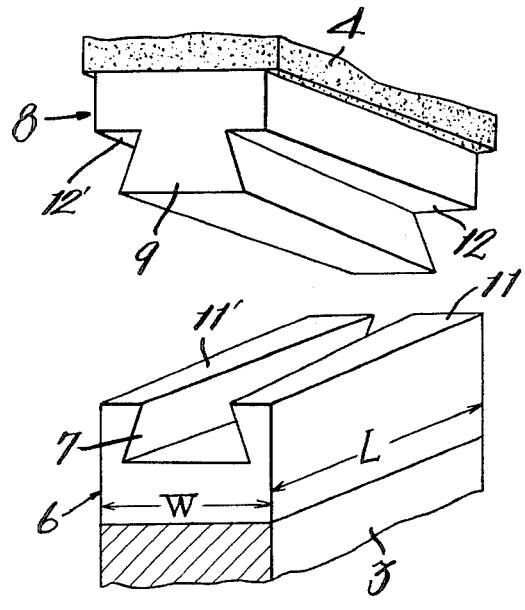
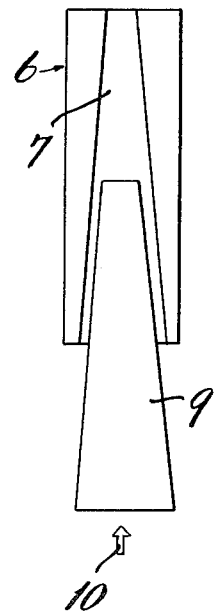

DIAMOND SEGMENTED SAW BLADE

BACKGROUND OF THE INVENTION

This invention relates to a diamond segmented saw blade for cutting of stones, concrete and so on.

Diamond segmented saw blades in the shape as shown in FIG. 1 were used heretofore in a big quantity for cutting stones, concrete, etc. and are composed of a steel center 1 and individual diamond impregnated tips 4. The steel center 1 has slots 2 defining segments 3 as well as a bore hole 5 to be fitted to a spindle.

Diamond segmented saw blades of such sizes as 2.5 m in diameter require steel centers of such thickness as 9 mm and such big and thick steel centers are so expensive that repeated usage of them by removing worn-out or broken diamond impregnated tips and mounting new ones are desired after service life spans of diamond segmented saw blades.

The above exchange as well as mounting of diamond impregnated tips has been commonly done by a brazing technology which requires specific equipments, long time and much labours and also may degrade quality of steel centers because of heating at a high temperature required to complete brazing.

In order to eliminate the above problems of the brazing technology, an interlocking method has been proposed according to German Pat. No. 2,314,977. As shown in FIG. 2, where a socket 6 having a tapered dovetail groove 7 is brazed onto each of the segments 3 of a steel center 1 and is equal in thickness W to the steel center and in length L to the segment. A diamond impregnated tip 4 is brazed onto a support 8 having a tapered dovetail 9 which is adapted to be fitted into said dovetail groove 7, and is pushed in the direction indicated by the arrow 10 in FIG. 3 to affix the support 8 in place. That is, as shown in FIG. 3, the dovetail arrangement is wedge-shaped in plan elevation so that the support 8 will remain immovably in place after it is forced into place. A diamond segmented saw blade made by this method must be rotated too so the cutting force is in said direction 10 during the cutting operation. Unmounting of the diamond segmented tips can be easily done by hitting the support from the opposite direction.

The above-mentioned method has achieved a great improvement in exchanges of diamond impregnated segments but has the disadvantage that the wedge-shape of said dovetail groove tends to be widened due to continuous cutting force and occasional impact in the cutting operation as well as due to the mounting force in direction 10 to push the dovetail 9 into place. As a result, the support may not stay at the set position or, at worst, can not be fixed in the groove any more and as the result correct mounting of diamond impregnated tips become impossible.

SUMMARY OF THE INVENTION

The object of this invention is to eliminate the disadvantage of prior art saw blades and to provide a diamond segmented saw blade which can keep the diamond impregnated tips at the set position firmly at all times, and to prevent the dovetail groove from being widened.

According to this invention, the diamond segmented saw blade comprises a steel center having sockets and supports having diamond impregnated tips. Each socket is provided with the upper surfaces inclined right and left in a roof shape and a tapered dovetail groove. Each support is provided with the lower surfaces inclined right and left and a tapered dovetail to fit into the dovetail groove so that the support and the socket are firmly interlocked to ensure easy and free exchange of diamond impregnated tips.

BRIEF DESCRIPTION OF DRAWINGS

FIG. 1 is a front view of the prior art diamond segmented saw blade;

FIG. 2 is an exploded perspective view of the prior art diamond segmented saw blade, in which diamond impregnated tips are mounted onto steel conters according to the conventional interlocking method;

FIG. 3 is a plane view thereof;

PREFERRED EMBODIMENT OF THE INVENTION

Figure 5:
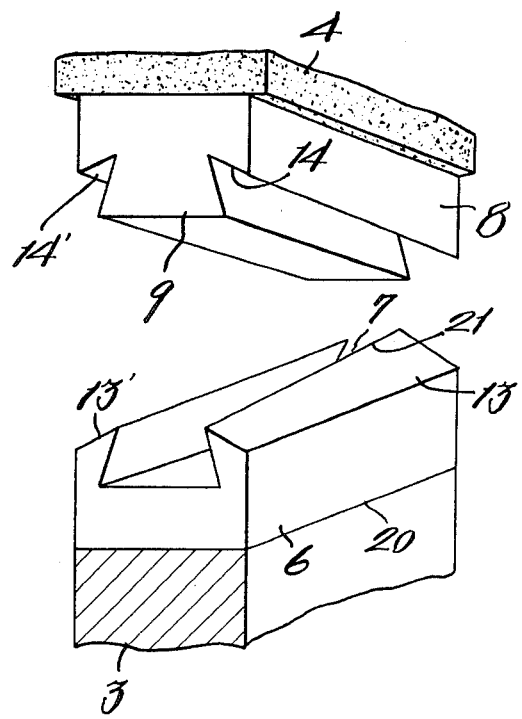
FIG. 5 is an exploded perspective view of the diamond segmented saw blade according to the present invention.
Figure 6:
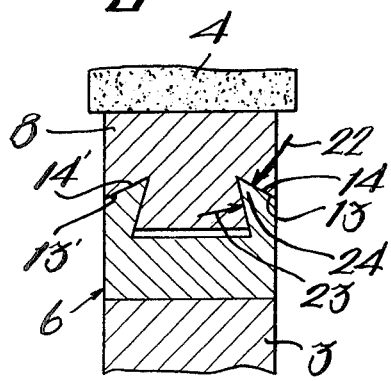
FIG. 6 is a vertical sectional view thereof.

This invention will be now described referring to FIG. 5 and FIG. 6 in the accompanying drawings in which the preferred embodiment of this invention is shown. As shown in FIG. 5 and FIG. 6, a socket 6 is provided with a tapered or wedge-shaped dovetail groove 7 like the conventional diamond segmented saw blade and is also additionally provided with the inclined upper surfaces 13 and 13' in a roof shape. The inclined upper surface 13 is tapered but is parallel to the generating line 20 of the socket and thus the edge line 21 of the surface 13 goes up gradually from one end to the other. That is, as shown in FIGS. 5 and 6, the surfaces 13 and 13' taper inwardly and upwardly from the edges.

A support 8 must have a shape to fit with said socket and thus has the inclined lower surfaces 14 and 14' and a tapered dovetail 9.

The reason why the diamond segmented saw blade according to this invention prevents the dovetail groove from being widened is explained below.

The principles of getting a set position and of the said wedging actions by pushing a wedge into a equally wedge-shaped groove will be clearly understood by FIG. 3. But at the same time another force works at right angles to the plane of FIG. 3. When the support 8 is pushed further in the direction 10 after the surfaces of the male and female dovetails in the support 8 and the socket 6 have made contact, an outwardly directed force 23, 23' is generated to pull the support toward the socket. That is, because of the slope of the dovetail, as the support is forced to the set position, a force is generated which pushes the walls of the socket and the support into intimate contact. This force is along the line 23, 23' and a component is in a direction to open the wedge shape of the dovetail groove. Also, a pressure arises between the upper surfaces 11' and 11' of the socket 6 and the lower surfaces 12 and 12' of the support 8 so that the support 8 can fit in the socket 6 firmly.

A dovetail groove 7 according to this invention is also tapered and pressure fitting of the dovetail tennon of the support into the dovetail groove generates a downward force on the support 8, (i.e., to pull the support 8 toward the socket 6) and, as a result, the lower surface 14 and 14' of the support 8 press down on the upper surfaces 13 and 13' of the socket 6. Such force applied to the upper surfaces 13 and 13' works in the direction along the normal line of the surfaces, (i.e. in the inclined direction as shown by the arrow 22 in FIG. 6) and the force has a component which pushes the wing 24 of the dovetail groove of the socket 6 inwardly and as a result compensates for the force 23 pushing the wing 24 toward the outside. Thus a force to widen the groove and another counteracting force to narrow the groove work simultaneously so as to prevent the groove from being widened.

Figure 4:
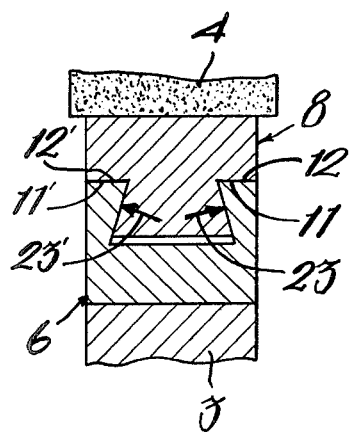
FIG. 4 is a vertical sectional view thereof.

The conventional interlocking method shown in FIGS. 2–4 does not compensate for forces 23 and 23' and results in a widening of the groove while this invention counteracts this specific feature as mentioned above and as shown in FIG. 6.

This invention is provided with a interlocking method having the properties of the conventional method for easier exchange of diamond impregnated tips in a short time with little labour without any specific equipment and without any heating process to damage the properties of steel centers. The present invention keeps blades mounted on cutting machines instead of the brazing method which required much labour and a long time as well as transportation of blades to factories installed with specific brazing equipments. Furthermore, this invention provides a superiority over the conventional method in fixing diamond impregnated tips at the set position on saw blades at all times due to the special structure of sockets which prevents widening of the dovetail groove so that the steel centers should have greater servicability and last longer.

What is claimed is:

1. A saw blade comprising a central member; a removable cutting tip; and mounting means between said central member and said cutting tip for removably mounting said cutting tip on said central member; said mounting means comprising a dovetail connection having a dovetail groove on one of said central member or said cutting tip and a tenon on the other of said central member or said cutting tip, said groove having side walls inclined toward each other from one end of said grooves to the other to define a wedge shape, and top walls adjacent the open top of said groove that taper upwardly and inwardly toward each other; and complementary formed walls on said other of said central member or said cutting tip.

2. A saw blade as in claim 1, in which a plurality of removable cutting tips are provided, and a like plurality of mounting means, each of said plurality of mounting means mounting a different one of said plurality of tips on said central member.

3. A saw blade as in claim 2, in which said cutting tip comprises a diamond blade.

4. A saw blade as in claim 3, in which said central member is segmented, and a different cutting tip on each one of said segments.

5. A saw blade as in claim 4, in which one of said grooves is provided in each segment of said central member.

6. A saw blade as in claim 5, in which said cutting tip further comprises a support having a diamond tip, a depending tenon on said support having side walls inclined toward each other to define a wedge shape complementary to said groove wedge shape, and top walls adjacent the top of said tenon tapering upwardly and inwardly toward each other complementary to said top walls adjacent said groove.

* * * * *